US012090472B2

(12) United States Patent
Rodriguez

(10) Patent No.: US 12,090,472 B2
(45) Date of Patent: Sep. 17, 2024

(54) METHOD FOR OBTAINING SYNTHETIC DIAMONDS FROM SACCHAROSE AND AN EQUIPMENT FOR CARRYING OUT SAID METHOD

(71) Applicant: Business Research and Diamonds, S.L., santa Cruz de Tenerife (ES)

(72) Inventor: Alvaro Reigosa Rodriguez, Tenerife (ES)

(73) Assignee: BUSINESS RESEARCH AND DIAMONDS, S.L., Santa Cruz de Tenerife (ES)

( * ) Notice: Subject to any disclaimer, the term of this patent is extended or adjusted under 35 U.S.C. 154(b) by 790 days.

(21) Appl. No.: 16/977,326

(22) PCT Filed: Jan. 28, 2019

(86) PCT No.: PCT/ES2019/070040
§ 371 (c)(1),
(2) Date: Sep. 1, 2020

(87) PCT Pub. No.: WO2019/166676
PCT Pub. Date: Sep. 6, 2019

(65) Prior Publication Data

US 2021/0001294 A1 Jan. 7, 2021

(30) Foreign Application Priority Data

Mar. 1, 2018 (ES) ................................ P201830196

(51) Int. Cl.
*B01J 3/06* (2006.01)
*C01B 32/28* (2017.01)
*G01K 7/02* (2021.01)

(52) U.S. Cl.
CPC ............... *B01J 3/065* (2013.01); *C01B 32/28* (2017.08); *G01K 7/02* (2013.01); *B01J 2203/0625* (2013.01); *B01J 2203/0655* (2013.01)

(58) Field of Classification Search
CPC ...... B01J 3/065; B01J 3/06; B01J 2203/0625; B01J 2203/0655; C01B 32/28; C01B 32/25; C01B 32/26; G01K 7/02
See application file for complete search history.

(56) References Cited

U.S. PATENT DOCUMENTS 6,030,596 A 2/2000 Vilella Jirau

FOREIGN PATENT DOCUMENTS

| | | | | |
|---|---|---|---|---|
| CN | 201592083 U | | 9/2010 | |
| CN | 202983638 U | | 6/2013 | |
| CN | 203018052 U | | 6/2013 | |
| CN | 106006605 A | | 10/2016 | |
| DE | 42 15 845 A1 | * | 11/1993 | ............. B01J 3/062 |
| ES | 2258920 A1 | | 9/2006 | |
| ES | 2258921 B2 | | 4/2007 | |
| ES | 2287565 T3 | | 12/2007 | |
| ES | 2301379 A1 | | 6/2008 | |
| JP | H09201525 A | | 8/1997 | |
| JP | H09249408 A | | 9/1997 | |
| KR | 2015 0 141 015 | * | 12/2015 | ............ C01B 32/20 |
| KR | 2015 141 014 A | * | 12/2015 | ............ C01B 32/28 |

OTHER PUBLICATIONS

International Search Report issued in corresponding PCT Application No. PCT/ES2019/070040 dated Apr. 11, 2019.

* cited by examiner

*Primary Examiner* — Timothy C Vanoy
(74) *Attorney, Agent, or Firm* — Carter, DeLuca & Farrell LLP

(57) ABSTRACT

The invention relates to a method for obtaining synthetic diamonds from sucrose, and to a device for carrying out said method, the method comprising: introducing sucrose or a solution of water and sucrose into a hermetic capsule without air, which is surrounded by an external container that keeps the volume of the capsule constant during the entire process; increasing the pressure inside the capsule by breaking down the sucrose inside the capsule, either by increasing the temperature or by combining the sucrose with sulfuric acid, until the carbon resulting from said pressure conditions of the capsule is transformed into diamond; and controlling the pressure generated inside the capsule, using containing means that apply pressure externally around the container of the capsule. In addition, extra carbon is added, increasing the dimensions of the diamond.

20 Claims, 6 Drawing Sheets

FIG. 1
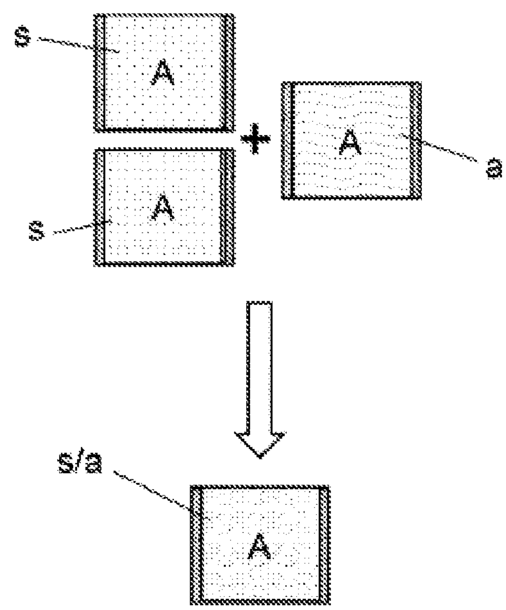
FIG. 2-A
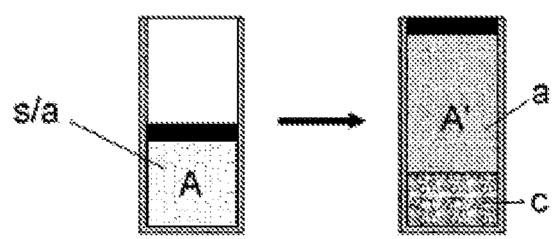
FIG. 2-B
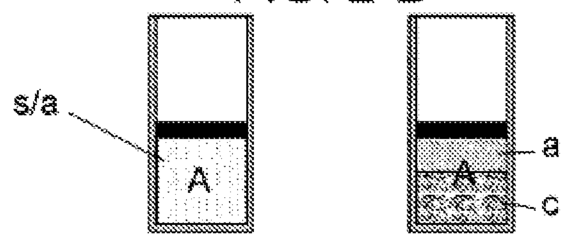

FIG. 3-A
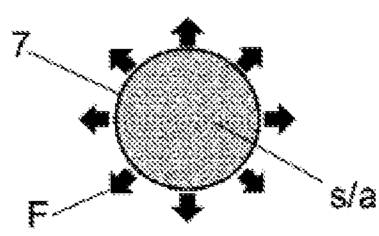
FIG. 3-B
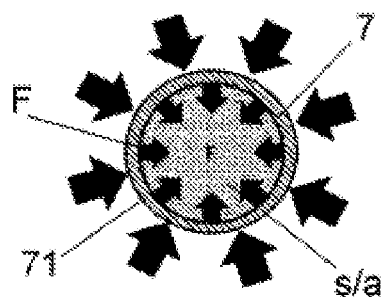
FIG. 4-A
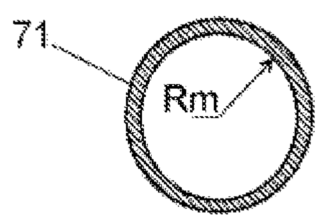
FIG. 4-B
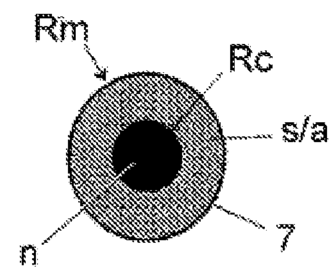
FIG. 4-C
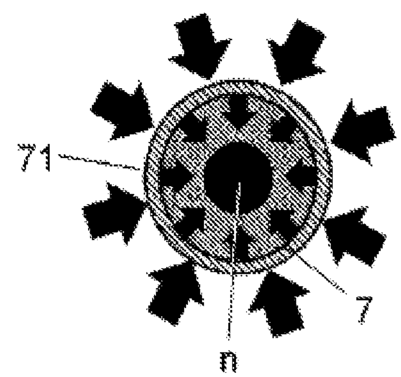
FIG. 4-D
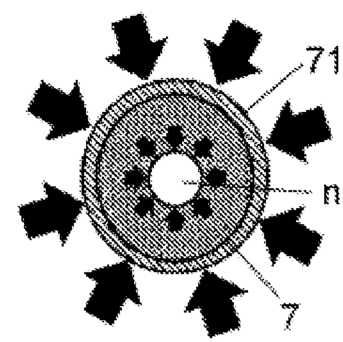

METHOD FOR OBTAINING SYNTHETIC DIAMONDS FROM SACCHAROSE AND AN EQUIPMENT FOR CARRYING OUT SAID METHOD

CROSS REFERENCE TO RELATED APPLICATIONS

This application is a national stage application of International Application No. PCT/ES2019/070040, filed Jan. 28, 2019, which claims the benefit of and priority to Spanish Patent Application No. P201830196, filed Mar. 1, 2018, the entire contents of each of which are hereby incorporated by reference herein in their entirety.

TECHNICAL FIELD

The invention, as stated in the present description, refers to a method for obtaining synthetic diamonds from saccharose (sucrose) and to an equipment for carrying out said method, the invention providing to the stated function a number of advantages and features disclosed herein below, where the invention is novel in view of the present state of the art.

More particularly, the object of the invention is a method for obtaining synthetic diamonds which, starting from saccharose or common sugar (C12H22O11), is based on the use of a pyrolysis process in the presence of water as the optimal method.

FIELD OF APPLICATION

The field of application of the present invention is the chemical and metallurgical sector, more particularly the industry dedicated to the production of synthetic diamonds.

BACKGROUND

Nowadays, within the state of the art in connection with processes for producing synthetic diamonds, the following methods are known:

The high pressure and high temperature method (HPHT). In this process, presses achieving pressures of around 5 GPa are used, and at the same time the carbon is subjected to high temperatures of around 1500° C.

The presses used in the HPHT method are: the belt press, the cubic press and the fractionated sphere BARS.

In the belt press there are two anvils, upper and lower, providing a pressure load to an inner cylindrical cell. This inside pressure is limited by means of a steel band belt. A variation of this press employs hydraulic pressure instead of steel cables for limiting the inside pressure.

The cubic press has six anvils providing pressure simultaneously to all faces of a cube shaped volume.

The BARS press has a bar device in its centre, a ceramic cylindrical "synthesis capsule" having a size of approximately 2 $cm^3$. The cell is situated inside a cube of material pressure transmission, such as pirofilite ceramics, which is compressed by inner anvils made of cemented carbide. The exterior octahedral cavity is pressed by 8 steel external anvils. After assembly, the unit is housed inside a disc type barrel having a diameter of approximately 1 meter. The barrel is filled with oil, whose pressure raises due to heating, and the pressure of the oil is transferred to the central cell. The synthesis capsule is heated by means of a graphite coaxial heater and the temperature is measured with a thermocouple.

In the HTHP method, independently of the presses employed, an external pressure provision is needed, as well as high temperatures (1500° C.).

Chemical vapour deposition (CVD) is a method where the diamond is created from a mix of hydrocarbon gasses. Unlike the HPHT process, the CVD process does not require high pressures, since the growing takes place at pressures below 27 kPa.

This process is mainly applied for covering surfaces with a layer of diamond, but not for obtaining pure diamonds.

The explosive detonation method can form diamond nanocrystals (diameter of 5 nm) by detonating certain explosives containing carbon and being oxygen deficient in a metal chamber. During the explosion, the pressure and temperature in the chamber is sufficiently high for converting the carbon of the explosives in diamond. Submerged in water, the chamber rapidly cools off after the explosion, and the conversion of the just produced diamond into more stable graphite is halted.

In the ultrasound cavitation method, micron sized diamond crystals can be synthesized from a suspension of graphite in an organic liquid at atmospheric pressure and room temperature using cavitation by ultrasounds.

Further, as relevant documents close to the object of the present invention, the following can be mentioned:

Patent application number 200500389 discloses a "Diamante sintético de distintos colores personalizado a partir de queratina humana o animal (vivo o muerto) y procedimiento para su fabricación". This invention provides a process for producing large diamond monocrystals having several colours from carbon contained in keratin in the ectoderm of several beings, in particular humans and mammals among others, where the obtention of carbon from a human being can be carried out by cutting a lock of hair and thereafter carbonizing it, thereafter submitting it to a high pressure and temperature process. Thereto, the essential operation steps are: obtaining carbon by carbonizing human or animal keratin present in samples of hair, nails, skin and other body parts; placing the carbon obtained in reaction capsules allowing for a vertical temperature gradient, and submitting the capsules to a process of high pressure and temperature gradients.

Patent having publication number ES2301379, consisting of improvements introduced in patent of invention P200500389 entitles "Diamante sintético de distintos colores personalizado a partir de queratina humana o animal (vivo o muerto) y procedimiento para su fabricación", discloses the use of tissue from the umbilical cord y/or the placenta of persons or animals, either dead or alive, as raw material for obtaining the cultivated diamond, said tissues being submitted to a carbonizing process which, as in the main patent, may be a strong acid carbonization, a muffle furnace carbonization, or a carbonization using a Bunsen lighter, blowtorch, or the like, where in the first case the carbon is obtained by decanting, filtering or centrifuging, and in the rest of cases is obtained by means of a mechanical dry scraping process or, optionally, set scraping and subsequent drying.

Patent of invention having publication number ES2287565 discloses a "Diamante monocristalino", specifically a process for producing a monocrystalline diamond plate which, as stated in claim 1, includes the stages of providing a diamond substrate having a surface, growing the diamond homoepitaxially on a surface of the substrate by chemical vapour deposition (CVD), and separating the diamond grown by epitaxial CVD and the transverse substrate, typically normal (that is, at or near 90°) to the substrate surface where the diamond growth took place for producing a monocrystalline CVD diamond plate having main faces transverse to the surface of the substrate. The homoepitaxial CVD diamond grown on the substrate surface takes place preferably by means of the process disclosed in document WO 01/96634. By using this process, in particular, by growing highly pure thick monocrystalline diamonds on a substrate is possible. A thickness of the homoepitaxial CVD diamond of more than 10 mm, preferably more than 12 mm, and most preferably more than 15 mm is achieved. Thus, by means of the method of the invention it is possible to produce monocrystalline CVD diamond plates having at least a lineal dimension of more than 10 mm, preferably more than 12 mm, and most preferably more than 15 mm. As "lineal dimension" it is understood any lineal dimension taken between two locations on or adjacent the main surfaces. For example, said lineal dimension can be the length of a substrate end, the dimension of an end, or a location on the end, towards the other end, or another location on the end, an axis or a similar dimension. In particular, by means of the method of the invention, it is possible to produce rectangular monocrystalline diamond (001) limited by surfaces or lateral faces (100) having at least a lineal dimension, such as an end lineal dimension, exceeding 10 mm, preferably exceeding 12 mm, and most preferably exceeding 15 mm. The monocrystalline CVD diamond produced by the method can thereafter be used as a substrate for the method of the invention. A monocrystalline CVD diamond can be homoepitaxially grown on a main surface of the plate.

However, none of the above-mentioned methods, patents or inventions, taken alone or combined, disclose the method or the equipment of the present invention, or represent the same or equivalent technical features as those claimed herein.

SUMMARY

Thus, the method for obtaining synthetic diamonds from saccharose and an equipment for carrying out said method proposed in the invention are novel within this field of application, where the characterizing details distinguishing the invention are conveniently presented in the final claims attached to the present description thereof.

More specifically, said method for obtaining synthetic diamonds is characterized by being a method where a pressure provision from the exterior is not necessary, since the pressure is generated in the interior due to the decomposition of saccharose, and only containing the saccharose is necessary for achieving the synthesis of diamond.

The generation of pressure is based on transforming the saccharose in carbon (carbonization) and water, where the inside water will produce the pressure needed for transforming carbon into diamond, as disclosed below.

The production process of the present invention is based on a reaction where the saccharose decomposes into carbon and water, therefor it is necessary to avoid oxygen provision from the outside before the decomposition begins, for avoiding reaction A and achieving reaction B, and for this reason the process is a pyrolysis without oxygen, but in case of the present invention we use a reaction C of pyrolysis in the presence of water.

Reaction A: $C_{12}H_{22}O_{11}+12O_2 \rightarrow 12CO_{2(g)}+11H_2O$ (I)

Reaction B: $C_{12}H_{22}O_{11} \rightarrow 12C_{(D)}+11H_2O$ (I) (PYROLYSIS)

Reaction C: $C_{12}H_{22}O_{11}+H_2O$ (I)$\rightarrow 12C_{(D)}+12H_2O$ (I) (PYROLISIS IN WATER)

Watching reaction B and knowing that the density of saccharose is 1.56 g/cm3, then, a mole of saccharose (342 g) will occupy a volume of 219.23 $cm^3$. The decomposition of saccharose into carbon and water will mean that these products will occupy a volume of 63.75 $cm^3$ for the carbon, since its density is 2.26 g/$cm^3$, and 198 $cm^3$ the water, since its density is 1 g/$cm^3$. Then, we have an initial volume occupied by the saccharose of 219.23 $cm^3$ and a final volume occupied by the products of 261.71 $cm^3$. That is, the volume occupied by the products of the decomposition (carbon and water) is greater than the volume occupied by the decomposed substance (saccharose).

If the saccharose is introduced into a watertight container and submitted to a high temperature, it will decomposed into carbon and water trying to occupy a volume higher than that of the container, but since the volume of the container is constant, the water will generate pressure within the inside of the container by compressing the carbon.

Once explained that the products, carbon and water, will occupy a higher volume than the initial volume occupied by the saccharose, we will introduce the compressibility module of the water as a relevant factor, and thereby we will analyse the volume occupied by water in the process.

As disclosed above, 1 mole of saccharose will occupy 219.23 $cm^3$, subtracting the volume occupied by carbon of 63.71 $cm^3$, then the volume available to be occupied by water is 155.52 $cm^3$, but the volume occupied by water after the decomposition is 198 $cm^3$.

We will use the following formula:

$$\Delta P=(2.2\times10^9)\times\Delta V/V_0$$

Where:

ΔP is the pressure rise inside the capsule due to the water, $2.2\times10^9$ is the compressibility constant of water measured in Pa, ΔV is the volume difference between the final volume occupied by water minus the volume the water can occupy after the reaction, and $V_0$ is the volume the water can occupy after the reaction By decomposing the formula, we obtain:

$\Delta P=(2.2\times10^9)\times(198-155.52)/155.52=0.6\times10^9$ Pa, a pressure which is still insufficient for reaching the pressure necessary for transforming carbon into diamonds.

To obtain greater pressures inside the capsule, the capacity of saccharose of occupying a smaller volume when mixed with water is taken into account. This is an important factor, since it not only allows for introducing a greater quantity of saccharose in the same volume, but it also guarantees the absence of air inside the volume. In this case, we are searching for reaction C above.

Starting from an empirical ratio where 2 volumes of dry saccharose occupy more than 2 volumes of saccharose after adding one volume of water, that is, 219.23 $cm^3$ of saccharose occupy more than the combination of 219.23 $cm^3$ of saccharose and 109.6 $cm^3$ of water. In particular, said volume of saccharose mixed with said volume of water will occupy 109.6 $cm^3$. We are going to calculate the new pressure rise generated within the capsule by following the above steps.

Once the calculations for 1 mole of saccharose of 342 g are adjusted, we have a volume occupied by saccharose of 219.23 $cm^3$, where 109.6 $cm^3$ of water are added, the mix occupying then 109.6 $cm^3$.

We then have the equation:

$$C_{12}H_{22}O_{11}+6H_2O \rightarrow 12C_{(g)}+17H_2O$$

We then have that 219.23 $cm^3$ of saccharose having added thereto 109.6 $cm^3$ of water, which occupies an initial volume of 109.6 $cm^3$, volume occupied by saccharose and the added water. By incrementing the temperature, the 1 mole of saccharose with mixed with 6 moles of water will decompose into 12 moles of carbon and 17 moles of water, these products occupying a total volume of: 63.72 $cm^3$ in the case of carbon and 306 $cm^3$ in the case of water, where the products have a final volume of 369.72 $cm^3$.

As explained before, to introduce the compressibility factor of water, the volume carbon will occupy of 63.71 $cm^3$ has to be subtracted from the initial volume of 109.6 $cm^3$. Then, the volume available for the water to occupy is 45.89 $cm^3$. If we have 17 moles of resulting water, said water will try to occupy a volume of 306 $cm^3$.

Therefore, since the volume of the capsule is constant, the inside pressure will rise as follows:

$$\Delta P=(2.2\times10^9)\times\Delta V/V_0$$

Where:

ΔP is the pressure rise inside the capsule due to the water, $2.2\times10^9$ is the compressibility constant of water measured in Pa, ΔV is the volume difference between the final volume occupied by water minus the volume the water can occupy after the reaction, and $V_0$ is the volume the water can occupy after the reaction By decomposing the formula, we obtain:

$\Delta P=(2.2\times10^9)\times(306-45.89)/45.89=12\times10^9$ Pa, the pressure needed for transforming carbon into diamonds. In fact, with this combination of 2 volumes of saccharose and 1 volume of water, we obtain such a high pressure that no existing material can contain it.

We must take into account that this pressure rise takes place at an initial stage of the process, and then it will decrease as the carbon transforms into diamond. This pressure reduction happens because the diamond is denser than carbon and it will therefore occupy less volume, and therefore the space available for the reaction water to occupy will be greater.

We must then calculate the minimum pressure achieved when the carbon transforms into diamond. Starting from the density of diamond of 3.53 g/$cm^3$ and the density of carbon 2.26 g/$cm^3$, we will calculate the volume occupied by diamond once formed and the pressure within the capsule generated by the decomposition water.

We will now make the calculations for the minimum pressures of the process when the carbon is transformed into diamonds.

As we did before, with 219.23 $cm^3$ of saccharose and adding 109.6 $cm^3$ of water, occupying an initial volume of 109.6 $cm^3$, by increasing the temperature 1 mole of saccharose mixed with 6 moles of water will decompose into 12 moles of carbon and 17 moles of water, the products occupying a total volume at the end of the process: 40.79 $cm^3$ in the case of diamond and 306 $cm^3$ in the case of water, the products having a final volume of 346.79 $cm^3$.

As explained before, for introducing the compressibility factor of water the volume occupied by diamonds 40.79 $cm^3$ is subtracted from the initial volume of 109.6 $cm^3$. Then, a volume of 68.8 $cm^3$ is available for the water to occupy. Since we have 17 moles of resulting water, said water will try to occupy a volume of 306 $cm^3$.

Therefore, since the volume of the capsule is constant, the inside pressure will increase as follows:

$$\Delta P=(2.2\times10^9)\times\Delta V/V_0$$

Where:

ΔP is the pressure rise inside the capsule due to the water, $2.2\times10^9$ is the compressibility constant of water measured in Pa, ΔV is the volume difference between the final volume occupied by water minus the volume the water can occupy after the reaction, and $V_0$ is the volume the water can occupy after the reaction By decomposing the formula, we obtain:

$\Delta P=(2.2\times10^9)\times(306-68.8)/68.8=7.58\times10^9$ Pa, a pressure higher than needed for transforming carbon into diamonds.

This pressure excess allows for the introduction of more carbon in the mix for obtaining diamonds of a different size, or else for reducing the proportions of water and saccharose for obtaining pressures that can be contained. We will move in the carbon-diamond phase diagram depending on the pressure we want, just by modifying the proportions of the water and saccharose mix.

In case we wanted larger diamonds, we can introduce a carbon nucleus in the water and saccharose mix. This carbon introduction will modify the volume proportions within the capsule, and therefore the pressures obtained will also be modified, new calculations being necessary for obtaining the pressures, since the pressures will reduce due to the presence of the carbon nucleus.

We will now make the calculations needed for the minimum pressures of the process when we introduce a carbon nucleus for obtaining a larger diamond.

We now start from 109.6 $cm^3$ of volume to occupy by a mix of water and saccharose once the 20 $cm^3$ carbon nucleus is introduced. In this case, we must recalculate the proportions of the mix, since we start from a volume of 109.6 $cm^3$ minus the 20 $cm^3$ of the carbon introduce, so the remaining volume is 89.6 $cm^3$. This available volume of 89.6 $cm^3$ will be filled by 89.6 $cm^3$ of water and by 179.2 $cm^3$ of saccharose. By increasing the temperature 179.2 $cm^3$ of saccharose, that is, 279,552 g of saccharose, that is, 0.817 moles of saccharose, and 4.97 moles of water will decompose. The products according to the reaction will be:

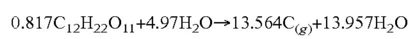

$$0.817C_{12}H_{22}O_{11}+4.97H_2O\rightarrow13.564C_{(g)}+13.957H_2O$$

As explained above, to introduce the compressibility factor of water, the volume occupied by the carbon diamond of 46.1 $cm^3$ needs to be subtracted from the initial volume of 109.6 $cm^3$. The volume the water can occupy is then 63.49 $cm^3$. If the resulting water is 13.957 moles, this water will try to occupy a volume of 251.226 $cm^3$.

Therefore, since the volume of the capsule is constant, the inside pressure will increase as follows:

$$\Delta P=(2.2\times10^9)\times\Delta V/V_0$$

Where:

ΔP is the pressure rise inside the capsule due to the water, $2.2\times10^9$ is the compressibility constant of water measured in Pa, ΔV is the volume difference between the final volume occupied by water minus the volume the water can occupy after the reaction, and $V_0$ is the volume the water can occupy after the reaction By decomposing the formula, we obtain:

$\Delta P=(2.2\times10^9)\times(251.226-63.49)/63.49=6.5\times10^9$ Pa, a pressure higher than needed for transforming carbon into diamonds.

In this case, after introducing a carbon nucleus, we have obtained a synthetic diamond of 46.1 cm3 instead of 40.79 cm3, where the pressure changed from $7.58\times10^9$ Pa to $6.5\times10^9$ Pa.

In this production process, the water and carbon diamond phase diagrams were taken into account for making the pressure and temperature stretches, considering the obtained water as supercritical water. Thus, since it is a supercritical fluid, it will dissolve the debris formed in the diamond during the production process.

One of the objects of this production process is keeping water in a supercritical state (temperatures above 374° C. and pressure above 221 atm) during an important part of the process in order to dilute possible debris existing inside the capsule and, in turn, to act as a solid/liquid within the phase diagram. One of the advantages of the present process consists in that once the temperature is reduced, the supercritical water goes from a liquid state to a solid state, thereby easing the compression of carbon.

In connection with the transformation of the decomposition of saccharose into carbon and water, a temperature of 560° C. must be reached (hydrogen auto-ignition temperature) in order to ensure the formation of water, thus easing the reaction between hydrogen and oxygen in order to obtain the greatest quantity of water as a product.

The proportions of carbon, hydrogen, and oxygen present in the saccharose make the formation of water and carbon when decomposing possible, thereby the use of water and saccharose being suitable for the desired reaction.

Sin a theoretical pressure of around 12 GPa is reached, the decomposition capsule must be surrounded by a body containing the pressure generated at the walls of the capsule, thereby along the volume to be constant. This will be developed in the section corresponding to a preferred embodiment of the invention.

However, optionally, the pressure increment can also be achieved by means of a combination of saccharose and sulfuric acid, where the result is carbon, water and sulfuric acid, thereby a heat provision system is not needed, since the dehydration takes place due to the acid introduce, although having the drawback that the corrosive element can wear the walls of the capsule.

The containment body, as an example and without limitation of the spirit of the invention, is designed by means of two tungsten semi spheres (because said metal has a resistance to compression of around 5300 to 7000 MPa) housing therein the spherical capsule in a cavity mechanized in each of them. The reason for using a semi sphere is that the exterior surface of the sphere, by applying pressure to said surface, can contain the pressure exerted by the decomposition of the mix within the mixing capsule. The surface of these two semi spheres support a pressure generated by oil compressed by a hydraulic bomb. To avoid the oil from filtering inside, the semi spheres are provided with a high pressure and temperature watertight seal. In order to contain the pressure generated by the oil, the assembly is surrounded by two stainless steel bodies having the necessary thickness to contain the pressure generated by the oil, and in order to guarantee the water tightness, the system is provided with an outer watertight seal between both stainless steel bodies.

Thus, the capsule having the mix of saccharose and water is subjected to high temperature by means of a graphite heater increasing the temperature for achieving the decomposition of saccharose into water and carbon, and thereby, as explained above, the quantity of product will increase the pressure within the capsule. Since the capsule is surrounded by the semi spheres receiving the pressure of the hydraulic oil in their exterior faces, it will be able to contain the pressure generated inside the capsule, thereby maintaining its volume constant. The pressure generated by the hydraulic oil is contained by the two stainless steel bodies. The necessary pressure can thereby be generated for transforming carbon into diamond.

In short, the method of the invention for obtaining synthetic diamonds from saccharose comprises, essentially, at least the following steps:

- Introduction of saccharose in a watertight capsule without air surrounded by an external container maintaining the volume of the capsule constant at all times during the method, where said saccharose is preferably introduced combined in a solution of water, since that allows for introducing a greater quantity of saccharose in the same volume, thereby allowing for incrementing the pressure and thus guarantee absence of air within the capsule.
- Increasing the pressure within the capsule (7) by decomposition of the saccharose within the capsule (7) for transforming the carbon resulting from said pressure conditions within the capsule into carbon.

Said pressure increment is achieved, preferably, by incrementing the temperature in the capsule up to, at least 560° C. for decomposing by pyrolysis of the saccharose into hydrogen, oxygen and carbon, thus causing the hydrogen and the oxygen to react for producing supercritical water that elevates the pressure within the capsule above 5.5 GPa, causing the resulting carbon to transform into diamond in view of the pressure conditions within the capsule, and causing the supercritical water to dissolve possible debris in the transformed carbon, thus obtaining diamonds of great purity.

However, optionally, the pressure increment can also be achieved by means of a combination of saccharose and sulfuric acid, the result being carbon, water and sulfuric acid, therefore it is not necessary to use a heat provision system, since the dehydration takes place due to the acid introduce, although a drawback consists on the introduction of a corrosive element that may produce wear in the walls of the capsule.

- And, as an essential step, control of the pressure generated within the capsule takes place by means of contention means, which may be hydraulic, mechanical or others, provided externally around the container of the capsule, applying an external pressure thereon.
- Additionally, the method of the invention is distinguished because pressure within the interior of the capsule increases by decomposition of the saccharose, because us of a combination of water and saccharose for introducing a greater quantity of saccharose within the same volume is made, thus allowing for a greater rise in pressure and thereby guaranteeing absence of air within the capsule, because the pressure within the capsule can be modified by modifying the proportion of saccharose and water introduced therein, and a complementary provision of carbon can be made for obtaining synthetic diamonds of a greater size.

As seen above, the described method for obtaining synthetic diamonds from saccharose and the equipment for carrying out said method constitute an innovation with structural and constituent characteristics unknown today, these reasons along with the practical utility provide the invention with enough basis for obtaining the exclusivity privilege applied for.

DESCRIPTION OF THE DRAWINGS

In order to complement the present description, and with the aim to aid in a better understanding of the characteristics of the invention, the present specification includes a set of drawings which, merely for illustration, non-limitative, purposes, show the following.

FIG. 1 shows, in a schematic drawing, the ability of saccharose to occupy half its volume when mixed with water that the method of the invention takes advantage of.

FIGS. 2A and 2B show respective schematic representations of the reaction of the mix of saccharose and water when discomposed and its container allows for increasing its volume or not. FIG. 2A show said reaction with a volume increase and FIG. 2B show the pressure increase when the volume cannot increase.

FIGS. 3A and 3B show schematic representations of the same reaction of the mix of saccharose and water when decomposed as in FIGS. 2A y 2B, with a volume increase or a pressure increase, in this case represented in the spherical mixing capsule according to the method of the present invention. FIG. 3A shows the mix with a volume increase and FIG. 3C shows the mix in the capsule with a pressure increase.

FIGS. 4A, 4B, 4C and 4D show schematic representations of the reaction phases of the mix of saccharose and water contemplated in the method of the invention shown in the previous figures, in this case represented with the mixing capsule housed within the container of the disclosed equipment and having a carbon nucleus for obtaining a greater size diamond. FIG. 4A shows the capsule before the reaction within the container, FIG. 4B shows the capsule with the carbon nucleus, FIG. 4C shows the reaction forces within the capsule, and FIG. 4D shows the formation of the diamond and the water obtained.

DETAILED DESCRIPTION

In view of the figures, and according to the reference numbers provided, the figures show, in addition to the representation of some phases of the method of the invention for obtaining synthetic diamonds from saccharose, an exemplary, non-limiting embodiment of the equipment for carrying out said method, which comprises the parts and elements indicated and disclosed in detail hereinbelow.

Therefore, in connection with FIGS. 1 to 4D, the operation principle upon which the method of the invention is based for obtaining synthetic diamonds is shown. Thus, FIG. 1 shows a scheme showing the property of saccharose to admit a great quantity of sugar in water. In particular, two volumes A of dry saccharose or sugar (s) can be contained in a single volume A when mixed with an identical volume A of water (a). This is because there is a great amount of air between dry sugar grains. When the sugar gets wet in water, the sugar grains become compact and the air between them disappears. Thus, a given volume A can be occupied by two volumes A of dry sugar (s) plus one volume of water (a).

Therefore, we introduce in the same container a larger amount of sugar, in a smaller volume.

FIGS. 2A and 2B show an illustration of the reaction of the mix of sugar and water (s/a) when the temperature raises, where the mix decomposes into carbon (c) and water (a) and occupies a greater volume A' than initially, FIG. 2A. This volume A' will depend on the proportions of sugar and water in the mix. If volume A of the container remains constant, a pressure rise will take place inside the container.

FIGS. 3A and 3B show a mixing capsule (7), that is, containing the mix of sugar and water (s/a), which in the preferred embodiment has an spherical configuration since, once decomposed when heated, the volume increases and a radially exterior force F appears, FIG. 3A. If this same spherical capsule (7) is, in turn, contained in a container sphere (7) capable of withstanding said force, the volume increase will remain constant, thus increasing the inside pressure, the pressure generating a radial force directed towards the centre of the sphere, FIG. 3B.

FIG. 4A shows the container sphere (7), having an inner diameter (Rm), and FIG. 4 shows a mixing capsule (7) having the same diameter (Rm) where a carbon nucleus (n) having a diameter (RC) has been added. FIGS. 4C and 4D show how the mix in the capsule (7), when it starts to decompose when getting hot, generates pressure and a force directed towards the carbon nucleus (n). The force applied to the surface of the mixing capsule (7) is the same as the force applied to the surface of the carbon nucleus (n), however, since the surfaces are different (the surface of the capsule is greater than the surface of the nucleus), the pressure against the surface of the carbon nucleus (n) will be much greater than the pressure against the walls of the container (7), always in case greater size diamonds are desired.

Figure 5:
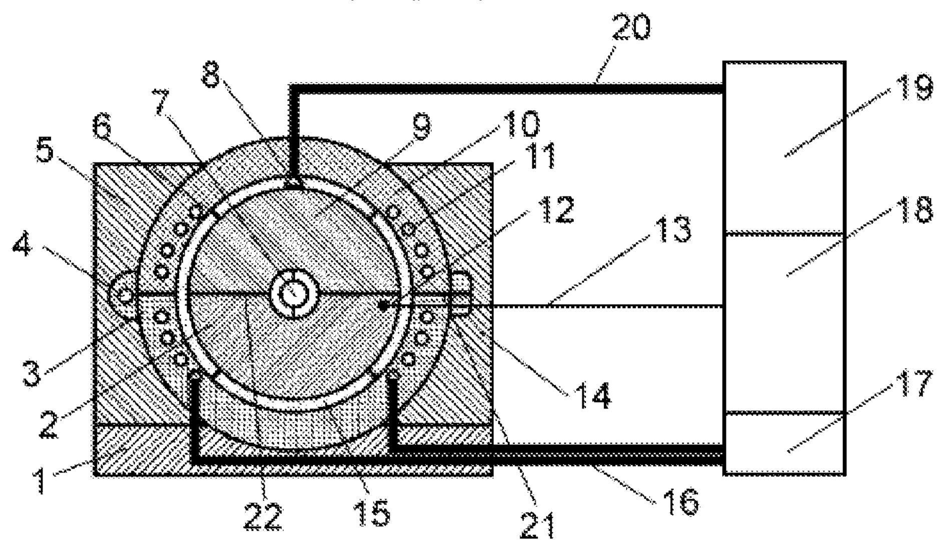
FIG. 5 shows a schematic and cross-section view of an example of the elements of the equipment of the invention for carrying out the method for obtaining synthetic diamonds from saccharose, where the main parts and elements, as well as the configuration and structure thereof are seen.

In turn, FIG. 5 shows a preferred embodiment of the equipment according to the invention for surrounding the mixing capsule (7) and containing the pressure generated inside during the reaction, comprising essentially the following elements:

A guide support (1), making up the platform on which respective exterior jackets are incorporated, a left jacket (14) and a right jacket (5), between which a spherical container divided into two contention semi spheres, a lower semi sphere (3) and an upper semi sphere (10) joined together by means of a joint (4) for opening and closing, inside which, in turn, the provision of two further semi spheres, a lower semi sphere (2) and an upper semi sphere (9), is contemplated, referred to as inner semi spheres in order to distinguish them from the abovementioned contention semi spheres (3, 10), which are equidistantly separated from said contention semi spheres (3, 10) by a number of separating ribs (6) defining a chamber containing hydraulic fluid, in particular a layer of oil (15), the mixing capsule (7) being snugly fitted inside said semi spheres (2, 9).

Further, the equipment contemplates the provision of a hydraulic valve (8) at the upper part of said chamber having the oil layer (15), connected to a hydraulic supply duct (20) which, in turn, is connected to a hydraulic supply unit (19), as well as a heating system (11) capable of increasing the temperature of the inside of the mixing capsule (7), connected, by means of wiring (16), an electric transform system (17), and a thermocouple sensor (12) installed, for example, in the lower semi sphere (2), connected, by means of a line (13), to a control system (18) managing the operation of the electric and hydraulic system.

Figure 6:
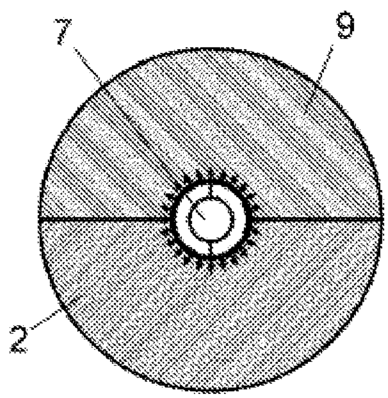
FIG. 6 shows a cross-section view of the mixing capsule comprising the equipment shown in FIG. 5, represented in the reaction phase, showing by means of arrows the pressure force exerted radially on the semi spheres surrounding it.

FIGS. 6 to 9 show the different operation phases of the equipment. Thus, FIG. 6 shows how the pressure exerted by the mixing chamber (7) is transmitted to the inner semi sphere (2) and to the upper semi sphere (9) by means of a radial force. Since the exterior radius is greater than the interior radius, the exterior pressure to be contained will be much lower than the inner pressure produced.

Figure 7:
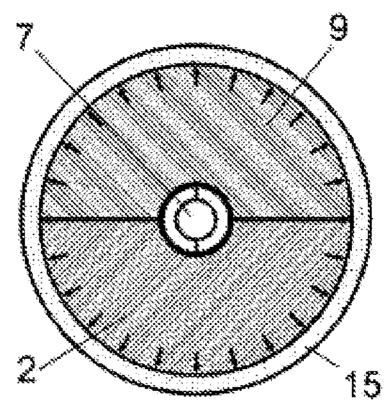
FIG. 7 shows again a cross-section view of the mixing capsule shown in FIG. 6, in this case the arrows show the radial pressure the semi spheres exert on the oil layer surrounding them.

FIG. 7 shows the radial force applied through the inside of the lower semi sphere (2) and to the upper semi sphere (9). Since the interior radius is much greater than the exterior radius, the exterior pressure will be much lower than the interior pressure, and it will be contained by an oil layer (15) under pressure.

Figure 8:
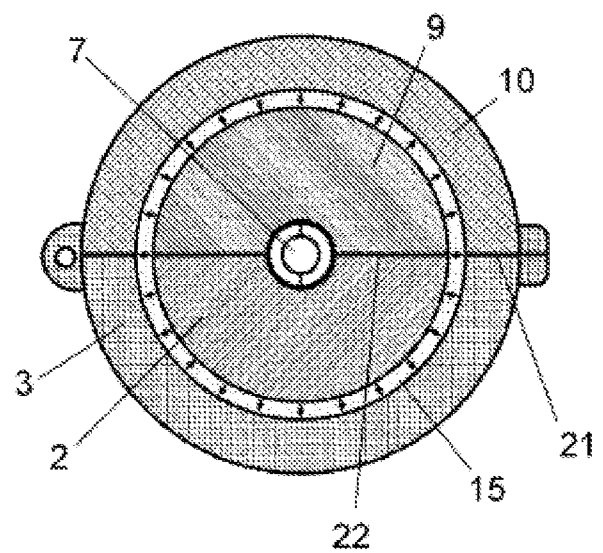
FIG. 8 shows another cross-section view of the mixing capsule shown in FIG. 7, in this case the arrows show the radial pressure the oil layer exerts on the container supporting the pressure.

FIG. 8 shows how the pressure the oil layer (15) is subjected to is contained by the lower contention semi sphere (3) and the upper contention semi sphere (10). These contention semi spheres (3, 10) have a thickness capable of withstanding the pressure exerted by the oil layer (15). They are fitted so that no oil can escape towards the outside, although for economic reasons an external watertight seal (21) for preventing oil leaks can be provided. Further, preferably an inner watertight seal (22) preventing oil leaks towards the inside is contemplated preferably between the semi sphere (2) and semi sphere (10) on which said oil layer (15) is provided.

Figure 9:
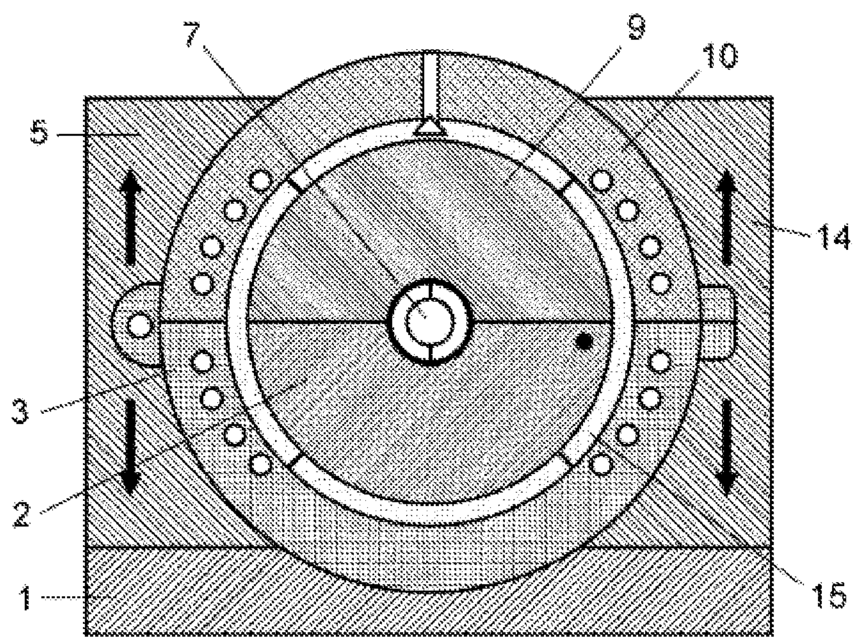
FIG. 9 shows a cross-section view of the mixing capsule shown in FIG. 8, in this case represented with the external jacket of the container, showing by means of arrows the cancelling of the force exerted thereon by the container for keeping the volume constant.

And FIG. 9 shows how the pressure exerted by the oil layer (15) on the surface of the lower contention semi sphere (3) and the upper contention semi sphere (10) produces a force indicated by means of black arrows which is cancelled by the exterior jackets (5) and (14), thus preventing the system from opening, the system being thus watertight and capable of keeping a constant volume at all times.

In the preferred embodiment of the equipment of the invention, when choosing the materials, the pressures to be contained/withstood and the melting points thereof have been taken into account.

Thus, preferably, the mixing chamber (7) is preferably made of tungsten, since the resistance to compression of said material reaches 7 GPa, and it also has a high melting point and a high thermal conductivity. In the inside, pressures generated by the decomposition of saccharose of near 7 GPa, necessary for the formation of diamonds, will take place.

Similarly, preferably the upper interior semi sphere (9) and the lower interior semi sphere (2) surrounding the mixing capsule (7) are made of tungsten, since the resistance to compression of said material reaches 7 GPa, and it also has a high melting point and a high thermal conductivity. In the inside, pressures near 7 GPa will be contained and on its external surface, the pressures generated in the inside will be contained by applying thereon pressures of 100 MPa by means of the hydraulic system.

On the other hand, the lower contention semi sphere (3) and upper contention semi sphere (10) are made of steel with a high resistance to compression and capable of supporting pressures of 100 MPa, and also having a high melting point and a high thermal conductivity. The surface of these elements will withstand pressures of 100 MPa. The oil layer (15) is provided between said contention semi spheres (3, 10) and the upper (9) and lower (2) semi spheres. Thus, it is critical that the thickness of both the lower (3) and upper (10) contention semi spheres be capable of supporting a pressure of 100 MPa.

Also, the left exterior jacket (5) and the right exterior jacket (14) are made of steel having a high resistance to compression, capable of withstanding a pressure of 100 MPa, and also having a high melting point and a high thermal conductivity. The surface of both jackets (5, 14) will withstand a pressure of 100 MPa and will prevent displacement of the lower container (3) and upper container (10).

Still defining additional features of the equipment for carrying out the method of the invention, it is worth mentioning that the function of the guide support (1) is to facilitate the displacement of the left exterior jacket (5) and the right exterior jacket (14) for opening it when appropriate, and it is preferably made of steel due to its great resistance.

The function of the thermocouple sensor (12) is to measure the temperature inside the two semi spheres (2, 9), and in order to do so it preferably has a measurement range of up to 1000° C., although thermocouples for greater temperatures can be employed.

The function of the exterior watertight seal (21) and the interior watertight seal (22) is to prevent oil leaks, they have a resistance high enough for withstanding a pressure minimum at the greater than 100 MPa and temperatures over 600° C.

The heating system (11), whose function is to heat the capsule (7) up to a temperature of 600° C., is preferably of induction type and it is controlled by means of an alternating current frequency and current intensity control system (18). The function thereof is limited by means of the thermocouple (12), which will detect whether the 600° C. are reached. In case the capsule (7) needs to be cooled off, the heater (11) will stop operating.

It must be understood that the heating system (11) disclosed may be of a different type, and the induction type is preferred because it is cleaner than other types of systems.

The function of the oil regulation valve (8) is limited to controlling the entry and exit of oil from the hydraulic supply unit (19). When 100 MPa are reached, the valve closes, and the oil layer (15) is kept under pressure. The valve (8) opens to allow the opening of the whole interior assembly and the extraction of the mixing capsule (7).

The electric supply wiring (16), electric supply unit (17) and hydraulic electric control system (18) is a common system for supplying electric current for the induction heater (11). The electric wiring provides the current from the electric system to said heater, and receives the signal from the thermocouple (12) to the control system (18). Said electric system also provides electric current to the hydraulic supply unit (19).

Preferably, the separation ribs (6) defining the oil layer chamber (15) between the inner semi spheres (2, 9) and the contention semi spheres (3, 10) are tungsten bars serving as guides for said semi spheres when extracting or positioning the mixing chamber (7).

The equipment may also comprise a hydraulic supply duct (20) consisting of a tube transporting the hydraulic fluid from the hydraulic supply unit (19) to the chamber making up the space contained between the inner semi spheres (2, 9) and the contention semi spheres (3, 10), which is built having a resistance capacity high enough for withstanding a pressure of 100 MPa.

The fluid making up the oil layer (15) enters under a pressure of 100 MPa in the aforementioned chamber between the inner semi spheres (2, 9) and the contention semi spheres (3, 10). As to the geometry of the disclosed elements of the equipment of the invention, the following for calculating the existing relationships between the capsule sides of the mixing capsule (7) and the radius of the semi spheres, as well as the relationship between the radius of the mixing chamber (7) and the carbon nucleus (n) if present, is worth mentioning.

Therefore, in order to calculate the surface of the mixing chamber (7) we will use formula $4\pi R^2$, having a surface of 150 $cm^2$. Said surface will receive a pressure of 7 GPa, and therefore we must calculate the radius of the inner semi spheres (2, 9) surrounding it for receiving an inside pressure of 7 GPa and for containing it by means of an external pressure of 100 MPa provided by the oil layer (15). Knowing that the surface of a sphere is $4\pi R^2$ and solving the following formula:

$$P_1XS_1=P_2XS_2$$

Where $P_1$ is the pressure generated inside the capsule, $S_1$ is the surface of the spherical capsule where pressure $P_1$ is produced.

Where $P_2$ is the pressure of the hydraulic system, and $S_2$ is the surface where the pressure of the hydraulic system $P_2$ is applied.

$$7\text{ GPa}\times 4\pi R_1^2=100\text{ MPa}\times 4\pi R_2^2$$

$$7\times 10^9\times 4\pi R_1^2=100\times 10^6\times 4\pi R_2^2$$

Then, if we solve this we obtain: $7\times 10^9\times 4\pi R_1^2=100\times 10^6\times 4\pi R_2^2$ $$P_1/P_2=R_2^2/R_1^2$$

$\sqrt{70}=R_2/R_1$ will be the relation ship between the radiuses using this contention method.

That is, in case we wanted to contain a pressure of 7 GPa generated by the capsule by means of the application of an exterior pressure using a 100 MPa hydraulic system, we then have to use a mixing capsule (7) having a radius $\sqrt{70}$ times smaller than the radius of the inner semi spheres (2, 9).

We can then say that, in order to contain an inside pressure of 7 GPa in a capsule having a radius of 5 cm, we must apply an external pressure of 100 MPa to two semi spheres having a radius of 41.83 cm.

Once the main dimensions of the elements making up the system are defined, we will describe the process itself. We will initially define a transformation method for synthetic diamonds for a capsule having a radius of 5 cm, obtaining a mix of saccharose and water suitable for a pressure of 7 GPa. Thereafter, we will define a process where a capsule having a radius of 5 cm is used, where the pressures can be withstood and where a larger synthetic diamond is obtained thanks to the addition of carbon.

As an example, we start from a watertight spherical tungsten capsule (7). The dimensions of the sphere radius inside is 5 cm, and therefore the inside volume of the sphere is 523.58 $cm^3$.

As mentioned above, we introduce a volume of water (523.58 $cm^3$), and in order to obtain a suitable inside pressure we introduce 900 cm3 of saccharose, instead of the allowable 1047.16 $cm^3$ of saccharose.

Once the capsule (7) is full, it is closed in a watertight manner. In this moment, the capsule is ready for being housed between the inner semi spheres (2, 9) and the contention semi spheres (3, 10).

The capsule is placed (7) within the lowersemi spheres (2, 3) and the upper semi spheres (9, 10) are coupled thereon, where the latter are lowered by means of a hydraulic harm. Once the capsule (7) is covered by the inner semi spheres (2, 9) and the contention semi spheres (3, 10), these are closed by means of the right jacket (14) and the left jacket (5), and they begin to be heated while compressed oil is provided through valve (8).

Once the capsule reaches a temperature over 186° C., the mix contained inside the mixing capsule (7) will start to decompose, thus building up pressure therewithin. In order to guarantee a controlled reaction between the decomposition hydrogen and oxygen, the autoignition temperature of the hydrogen must be reached as soon as possible, this temperature being over 565° C. Thus, all the oxygen and hydrogen produced will react for making up water. We would then have the following reaction:

1404 g of $C_{12}H_{22}O_{11}$ (saccharose in the mix)+523.58 g of $H_2O$ (water in the mix)→decompose into→591.15 g of $C_{(D)}$ and 1336.42 g of $H_2O$.

Starting form an initial volume of 523.58 $cm^3$, when the graphite turns into diamond, the final volume to occupy will be 356.11 $cm^3$, and therefore the pressure within the capsule once transformed into diamond will be of 6.06 GPa.

Watching the phase diagrams of carbon (FIG. 10) and water (FIG. 11) at a pressure of 6.06 GPa and 560° C. we see, in the case of carbon, as a diamond, and in the case of water as a liquid. If we slowly decrease the temperature, the carbon will be in a diamond phase, and water will turn from a liquid state to a solid state, guaranteeing a complete transformation of carbon into diamond. In this case, we obtain a diamond of 167.47 $cm^3$.

Figure 10:
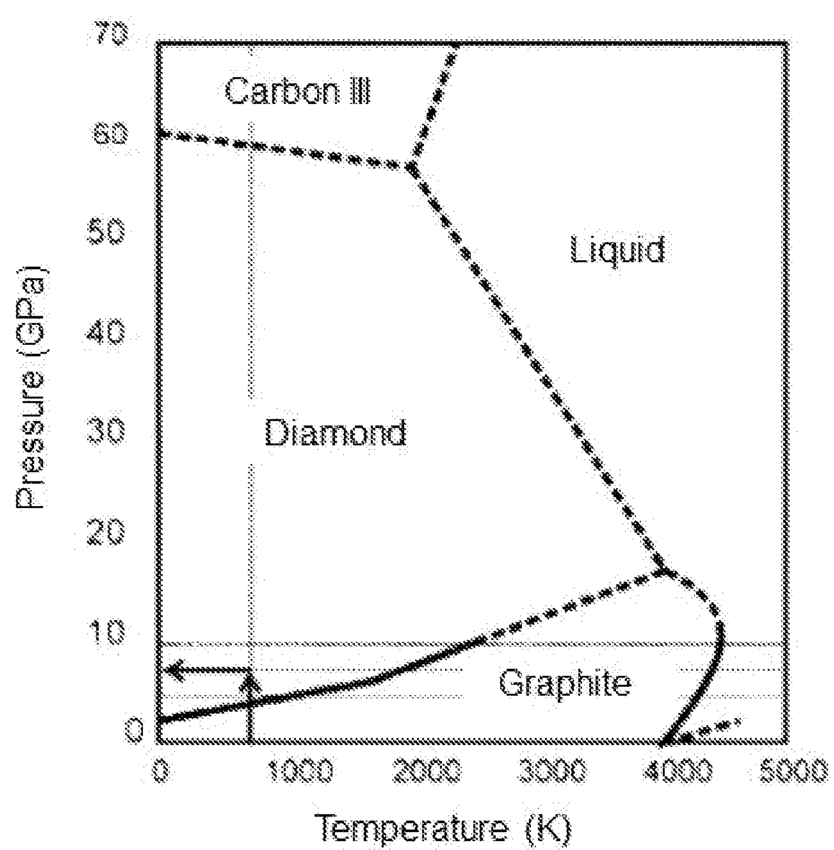
FIG. 10 shows a diagram of the carbon-diamond phases indicating the pressure and temperature range where the process must be to obtain diamonds.

FIG. 10 shows a phase diagram corresponding to carbon-diamond, which indicates the range of pressure and temperature needed for obtaining diamonds.

Figure 11:
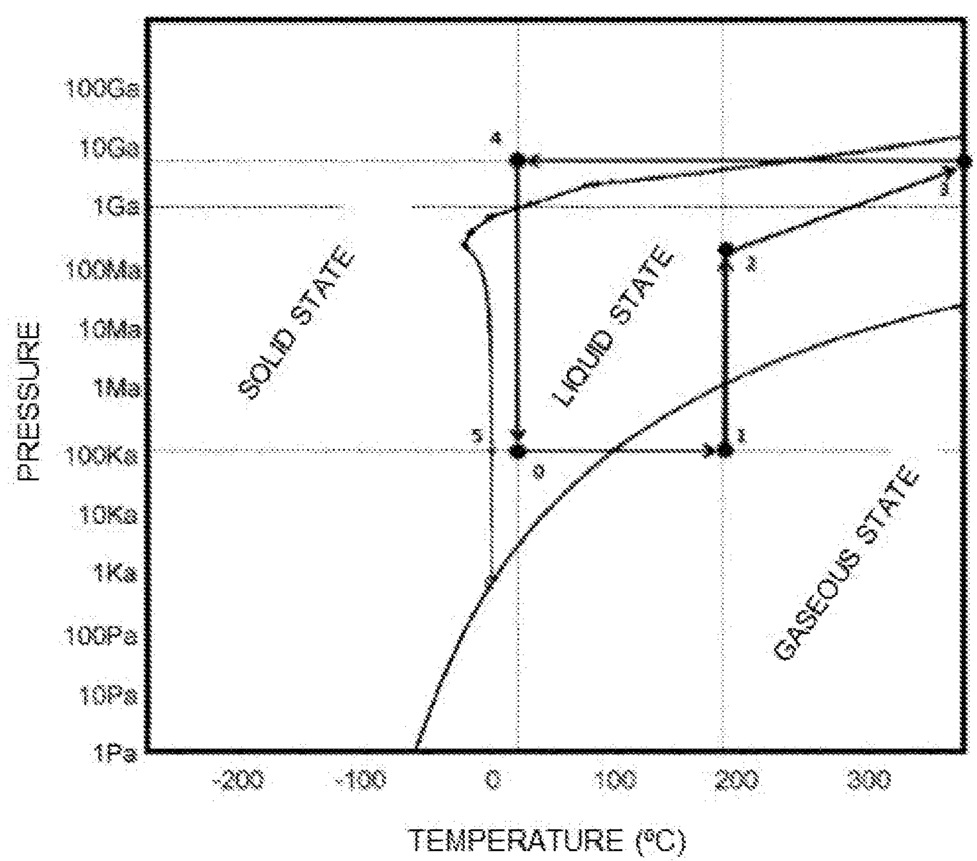
FIG. 11 shows a phase diagram of water indicating, by means of arrows, the process in each moment of the decomposition of the mix and the state of water in each stretch.

FIG. 11 shows a phase diagram corresponding to water indicating, by means of arrows numbered from 1 to 5, the method at each moment during the decomposition of the mix and the state of the water at every stretch.

In case a larger diamond was needed, we will start from a 523.58 $cm^3$ capsule where we will introduce a carbon nucleus of 150 $cm^3$ and a mix of 373.58 $cm^3$ of water and 747.16 $cm^3$ of saccharose.

We start, for example, with a tungsten spherical capsule (7) having a watertight closure. The dimension of the radius of the sphere inside it is 5 cm, and therefore the inside volume will be 523.58 $cm^3$.

A carbon volume of 150 $cm^3$ is introduced therein, as well as a mix of 373.58 $cm^3$ of water and 747.16 $cm^3$ of saccharose.

Once the capsule is full (7), it is closed under pressure by means of a watertight closure. At this moment, the capsule is ready for being housed between the inner semi spheres (2, 9) and the contention semi spheres (3, 10).

The capsule (7) is placed within the lower semi spheres (2, 3) and the upper semi spheres (9, 10) are coupled thereon, where the latter are lowered by means of a hydraulic arm. Once the capsule (7) is covered by the inner semi spheres (2, 9) and the contention semi spheres (3, 10), these are closed by means of the right jacket (14) and left jacket (5), and the are heated while compressed oil is supplied through valve (8).

Once the capsule reaches a temperature over 186° C., the mix contained inside the mixing capsule (7) will start to decompose, thus building up pressure therewithin. In order to guarantee a controlled reaction between the decomposition hydrogen and oxygen, the autoignition temperature of hydrogen must be reached as soon as possible, this temperature being over 565° C. Thus, all the oxygen and hydrogen produced will react for making up water. We would then have the following reaction:

1165.56 g of $C_{12}H_{22}O_{11}$ (saccharose in the mix)+373.58 g of $H_2O$ (water in the mix)+339 g (carbon nucleus)→decompose into→828.45 g of $C_{(Diamond)}$ and 1048.38 g of $H_2O$.

Starting form an initial volume of 523.58 $cm^3$, when the graphite turns into diamond, the final volume to occupy will be 288.89 $cm^3$, and therefore the pressure within the capsule once transformed into diamond will be of 5.78 GPa.

Watching the phase diagrams of carbon (FIG. 10) and water (FIG. 11) at a pressure of 5.78 GPa and 560° C. we see, in the case of carbon, as a diamond, and in the case of water as a liquid. If we slowly decrease the temperature, the carbon will be in a diamond phase, and water will turn from a liquid state to a solid state, guaranteeing a complete transformation of carbon into diamond. In this case, we obtain a diamond of 234.68 $cm^3$.

Once the nature of the invention is sufficiently disclosed, as well as the way to put it into practice, we consider that no further description is necessary for a skilled person to understand the scope and the advantages deriving therefrom, and within its essentiality it can be put into practice according to different embodiments having diverging details with respect to the examples shown, and these will also be protected as long as its main principle is not changed, modified or altered.

The invention claimed is:

1. A method for obtaining synthetic diamonds from saccharose, comprising:

introducing saccharose in a watertight capsule and without air surrounded by an external container maintaining volume of the capsule constant during the whole process;

increasing the pressure within the capsule by the decomposition of saccharose inside the capsule until carbon resulting from these pressure conditions within the capsule turns into diamond; and controlling pressure generated within the capsule by externally applying pressure around the container of the capsule.

2. The method according to claim 1, wherein the decomposition of saccharose for causing a pressure increase is achieved by increasing the temperature of the capsule until the saccharose housed inside decomposes by pyrolysis into hydrogen, oxygen and carbon, and causing the hydrogen and oxygen to react for providing supercritical water that further increases the pressure within the capsule in order for the carbon resulting from those pressure conditions in the capsule to transform into diamond, and the supercritical water dissolves the debris existing in the transformed carbon.

3. The method according to claim 2, wherein the saccharose introduced in the capsule is combined in a water solution in order to introduce a greater quantity of saccharose within a same volume and thereby incrementing the pressure while guaranteeing absence of air inside the capsule.

4. The method according to claim 2, further comprising complementary providing-of carbon inside the capsule together with the saccharose or a mix of saccharose and water in order for the reaction carbon to be added thereto for increasing dimensions of the diamond obtained.

5. The method according to claim 1, wherein the decomposition of saccharose for causing the pressure increase is achieved by a combination of the saccharose introduced in the capsule with sulfuric acid, the result being carbon, water and sulfuric acid, since the pressure increase within the capsule is caused by dehydration produced by the sulfuric acid.

6. The method according to claim 1, wherein the controlling of the pressure generated within the capsule is performed by at least one of a hydraulic fluid system and a mechanical system.

7. The method according to claim 1 wherein, in order to contain an inside pressure of 7 GPa in a capsulehaving a radius of 5 cm, an external pressure of 100 MPa is applied to an equipment having semi spheres with a radius of 41.83 cm, maintaining a relationship with the radius of the semi spheres $\sqrt{70}$ times larger than the radius of the capsule.

8. A device for obtaining synthetic diamonds from saccharose comprising:

two external jackets, a right jacket and a left jacket, between which is housed a spherical container divided into two contention semi spheres, a lower semi sphere and an upper semi sphere, inside which, in turn, comprises two interior semi spheres, a lower interior semi sphere and an upper interior semi sphere, separated by a chamber having hydraulic fluid, wherein the lower interior and upper interior semi spheres house a mixing capsule and a heating system capable of increasing temperature inside the mixing capsule.

9. The device according to claim 8, further comprising a hydraulic valve at an upper part of the chamber having fluid, connected to a hydraulic supply duct which, in turn, is connected to a hydraulic supply unit.

10. The device according to claim 8, further comprising a thermocouple sensor for measuring the temperature within the inside of the interior semi spheres having a measurement range of up to 1000° C. or more.

11. The device according to claim 8, wherein the heating system is connected to an electric transform system and a thermocouple is connected to a control system managing the operation of the electric transform system and a hydraulic system.

12. The device according claim 8, wherein the external right and left jackets are incorporated on a guide support for easing displacement thereof.

13. The device according to claim 8, wherein the interior semi spheres are equidistally separated from the contention semi spheres by separating ribs defining the chamber containing hydraulic fluid.

14. The device according to claim 13, wherein the separating ribs defining the chamber between the interior semi spheres and the contention semi spheres are tungsten elements serving as guides for the semi spheres at a moment of extracting or positioning the mixing capsule.

15. The device according to claim 8, wherein the capsule is made of tungsten.

16. The device according to claim 8, wherein the interior semi spheres are made of tungsten.

17. The device according to claim 8, wherein the lower contention semi sphere and the upper contention semi sphere are made of high resistance steel capable of withstanding pressures of 100 MPa.

18. The device according to claim 8, wherein the left exterior jacket and the right exterior jacket are made of high resistance steel capable of withstanding pressures of 100 MPa.

19. The device according to claim 8, wherein, in order to prevent fluid leaks, between the lower contention semi sphere and the upper contention semi sphere an external watertight seal is provided, and between the lower interior semi sphere and the upper interior semi sphere an internal watertight seal is provided, both having a resistance capable of withstanding pressures over 100 MPa and temperatures over 600° C.

20. The device according to claim 8, wherein the heating system is an induction type system.

* * * * *